Nov. 24, 1964   G. C. BEASON ETAL   3,158,318
DETENT CONTROLLING MECHANISM

Filed Sept. 12, 1963   6 Sheets-Sheet 1

FIG.1

INVENTORS
GEORGE C. BEASON
CALVIN E. STICHWEH

BY

THEIR ATTORNEYS

Nov. 24, 1964  G. C. BEASON ETAL  3,158,318
DETENT CONTROLLING MECHANISM
Filed Sept. 12, 1963  6 Sheets-Sheet 4

INVENTORS
GEORGE C. BEASON
CALVIN E. STICHWEH
BY
THEIR ATTORNEYS

Nov. 24, 1964  G. C. BEASON ETAL  3,158,318
DETENT CONTROLLING MECHANISM
Filed Sept. 12, 1963  6 Sheets-Sheet 6

INVENTORS
GEORGE C. BEASON
CALVIN E. STICHWEH
BY
Louis A. Kline
Richard W. Lavin
THEIR ATTORNEYS United States Patent Office 3,158,318
Patented Nov. 24, 1964

3,158,318
DETENT CONTROLLING MECHANISM
George C. Beason and Calvin E. Stichweh, Dayton, Ohio, assignors to The National Cash Register Company, Dayton, Ohio, a corporation of Maryland
Filed Sept. 12, 1963, Ser. No. 308,382
5 Claims. (Cl. 235—146)

This invention relates to improvements in accounting machines and particularly to a machine for posting accounts in a savings bank.

The machine of the present invention is one which is identified as a bank teller's window machine and is used in posting and updating savings and commercial accounts. In order to reduce the time required to complete a commercial transaction using this type of a machine, a system incorporating a data-processing computer linked to each of a number of teller's window machines has been developed. Under this system, the window machines have the ability to have direct access, an a random basis, to the account balances maintained in the bank's central accounting location and stored in the computer. The computer has the ability to send this type of information back to the window machines and to operate the machines so as to automatically update the customer's passbook and post the current transaction.

In order for the bank teller's window machine to receive messages from the computer and to be operated in the same manner as if the information were being entered manually by the operator, a solenoid-operated auxiliary keyboard is mounted on the regular keyboard of the window machine. This auxiliary keyboard permits either the operator or the computer to enter information and operate the window machine. As part of this commercial transaction, after the required information has been entered manually into the auxiliary keyboard by the bank teller, the auxiliary keyboard is required to be locked out while the computer is operating. It is therefore an object of this invention to provide means which, when operated, prevents the manual depression of the keys in the auxiliary keyboard but allows the auxiliary keyboard to be operated by the computer.

It is a further object of this invention to provide lockout means for the keys of a solenoid-operated auxiliary keyboard in which the lockout means may be operated by any number of different keys on the keyboard.

With these and other objects in view, the invention includes certain novel features of construction and combinations of parts, a preferred form or embodiment of which will hereinafter be described with reference to the drawings which accompany and form a part of this specification.

The invention disclosed herein is adapted to a machine of the type illustrated and described in United States Patent No. 2,774,298, issued to Everett H. Placke et al. on December 18, 1956. The machine of said patent was provided for use in a savings bank wherein the depositor is provided with a passbook which is presented to the teller at the time the deposit or the withdrawal is made. The bank has a ledger card bearing records corresponding to the records made in the passbook. Thus, as part of any commercial transaction, both the passbook and the bank record must be updated.

The machine of the above-cited Placke et al. patent, in which the invention is incorporated, has three printing sections. The left-hand section 43 (FIG. 1) is provided with a table for receiving the ledger card. The center section is provided with a table for the passbook, and the right-hand section is provided with a printing mechanism for printing, on an audit strip which is retained in the machine, all the data entered in the book and on the ledger card. Also included in the machine is a line-finding mechanism, which allows the teller to position the book and the ledger card on the table in accordance with the last line upon which an item was printed. The machine is provided with an add-subtract totalizer, which allows the printing of proper balances, whether they be positive or negative, or whether a deposit amount or a withdrawal amount is being entered. In addition to the add-subtract totalizer, which may be identified as a crossfooter, the machine is provided with ten interspersed totalizers, nine of which are selected by the keys of the third bank of transaction keys, which keys will be described more fully hereinafter. The Duplicate Withdrawal key, in the second transaction bank, controls the tenth totalizer. Each of the above-cited mechanisms is fully described and disclosed in the previously-mentioned Placke et al. United States patent and is therefore not illustrated herein.

Figure 1:
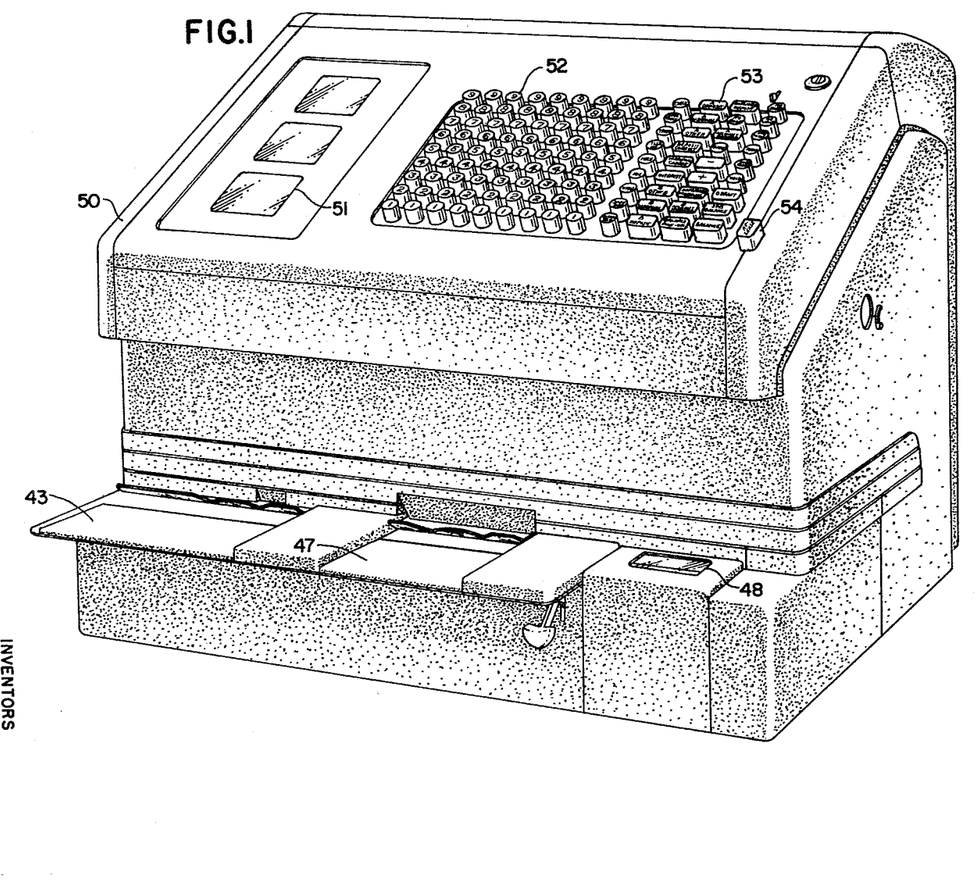
FIG. 1 is a front elevational view of the bank teller's machine showing the auxiliary solenoid-operated keyboard mounted on the machine.

The system to which the present machine is applied includes a computer, a buffer unit, a controller, and the window machine. When the window machine is in communication with the computer, the mode of operation is described as "on-line." In case there is a breakdown in the computer or any other part of the system, the window machine may be operated alone and is identified in this case as being operated "off-line." As shown in FIG. 1, the window machine has superimposed on its regular keyboard the auxiliary keyboard 50, which has the capability of being operated manually by the teller and electrically by the computer. In a typical deposit operation to which the system is applied, the customer presents his passbook, transaction slip, and cash or check to a teller for a deposit. The teller verifies the amount of the deposit, then enters the passbook balance, the amount of the transaction, and the account number into the window machine. This information is transmitted to the computer. When the account number is received, this is notice to the computer that this is the end of the message. The proper account record then is selected by the computer, and the passbook balance is compared with the bank balance. If the balances agree, the bank balance is increased by the amount of the deposit, and a message is returned to the window machine to operate the machine, thereby causing it to print the transaction and the new balance in the passbook. If the balances do not agree, the computer applies any unposted interest and any other unposted no-book transaction to the passbook balance and then compares the result with the bank's balance. If the two balances agree, the deposit is applied to the bank balance, and messages containing all the information to update the passbook and post the new balance are sent to the window machine. In the event that the balances do not agree or the account cannot be located, a message causing an indicator light on the auxiliary keyboard to illuminate is returned to the window machine, thereby notifying the operator of this fact.

The function of the controller in this system is to act as a code-converting device which reads each digit and converts each digit read from the auxiliary keyboard of the window machine into a four-bit binary coded decimal which is acceptable to the computer. This information then is transmitted to the buffer unit, which introduces the information into the computer when the computer is ready to receive. In this system, each computer can be connected up to a maximum of sixteen buffers, and each buffer can be connected to eight controllers. Each controller unit can be connected to sixteen window machines. Each of the controller units and the buffer units is provided with scanning means, thus allowing the computer to operate continuously. When the message is sent from the computer to the window machine, the reverse operation takes place.

The auxiliary keyboard 50 includes three windows 51 (FIG. 1), in which are located signal lights controlled by the computer to inform the operator of the status of the operation and of the account, a set of nine banks of amount keys 52, and four banks of transaction keys 53. Also located on the auxiliary keyboard is a Release key 54, which is used to release the keys on the keyboard if for any reason it is desired to release them after they have been depressed and before the machine has been released for operation. Also located on the keyboard is a key lock 55, for unlocking the keyboard for operation.

The automatic controls effected by each key of the four transaction banks 53 are briefly tabulated below:

Balance Key

On-Line: Depression of the Balance key caused by an end of message from the computer clears the crossfooter, prints on the audit tape, prints in the balance column on the passbook printer and the validating printer, ejects the passbook, and signal-end-of transaction, and unlocks the keyboard.

Off-Line: Depression of the Balance key by the operator clears the crossfooter, prints on the audit tape, prints in the balance column in the passbook printer and the validating printer, and ejects the book unlock No-Book and Balance Pick-Up keys.

Sub-Balance Key

On-Line: Machine can follow every transaction posting with a sub-balance operation. The output message contains a signal in the auxiliary control position to indicate whether this following operation should be a balance operation or a sub-balance operation or a non-extend signal to eliminate the following operation.

Off-Line: Sub-Balance key is used to extend balance whenever there are additional entries to be made to an account or when balance must be forwarded from one page to another. Depression of the key causes the crossfooter to be read and the balance to be printed on the audit tape, the passbook printer, and the validating printer.

Overdraft Key

On-Line: Has the same function when the acount balance is overdrawn as the Balance key has when the balance is a good balance. Message from the computer will not cause machine to operate automatically. The key must then be depressed by a teller to extend the balance.

Off-Line: Same as Balance key.

Void Key

On-Line: There are occasions when it is not desirable to complete a transaction that has been begun. It is then necessary to clear the crossfooter of the window machine, clear the assembly area in the computer, non-print the passbook printer and the validating printer, and cause the passbook to be ejected.

Off-Line: The Void key is not normally used in the off-line mode.

Override Key

On-Line: Is operated by a signal from inquiry controller when parity error on output has been detected. Non-prints the passbook and validating printer, and non-adds the crossfooter and the accumulating totals. This key is used by the operator under the following conditions: When the computer sends a signal indicating that a special condition exists on this account. An example of this would arise when a withdrawal in excess of the available balance (a balance smaller than the actual balance by the amount of the checks deposited but not yet collected) has been entered. The teller upon investigation finds that the withdrawal will be allowed, and, by depression of the Override key, signals to the computer to go ahead and complete the transaction. In some instances, this special condition may require more than a teller's approval for completion of the transaction. By sending a different signal, the computer can set up a second condition requiring that the total lock be unlocked before the Override key will operate the window machine. Since the total lock will be under the control of the supervisor, this will force supervisory control of this override condition. An example of when this will be used will occur when a dormant account is addressed by a window machine and the bank requires dual control (teller and supervisor approval) over this classification of account. The third condition occurs when it is necessary to insert a form into either the validating printer or the passbook printer. If the teller has failed to insert a passbook into the passbook printer or a receipt into the validating printer, the window machine will create a special condition (through the use of slip feelers) that will cause the window machine to present a busy signal to the computer to prevent transmission of the output message. At this point a light will be illuminated, indicating the reason for the machine stoppage. The teller will insert the proper form and then depress the Override key. The final condition occurs when the window machine attempts to post beyond the last line of the passbook. The same condition as stated under the third condition above will exist, and the operation to relieve the condition will be the same.

Off-Line: Has no function.

Total Key

This key is used with keys in the third transaction bank to clear the nine individual accumulations. It is also used with a key in the second transaction bank to clear the tenth accumulator. This key is under lock control, which allows the supervisor to override special conditions signals from the computer. Use of this key causes printing on the audit tape and in the balance column on the passbook printer and the validating printer.

Sub-Total Key

This key is used with the keys in the third transaction bank to read the nine individual accumulations. It is also used with the keys in the second transaction row to read the tenth accumulator. The use of this key causes printing on the audit tape and in the balance column on the passbook printer and on the validating printer.

Receive Key

On-Line: This key can be depressed only by the computer. This key must be depressed to allow any transaction key to print on the passbook printer or the validating printer or to affect the crossfooter or the accumulating totals.

Off-Line: This key must be locked down to permit any transaction key to print and add on entry by the operator.

Re-Entry Key

In the event that the central processor cannot be kept in contact with the window machine, the window machine will be switched to the off-line mode. At the end of the day (or whenever the computer is again available), it will be necessary to re-enter the information used to post the customer's passbook. This is necessary to update the bank's records and assure that the two records are in agreement. This key has been included in order to provide protection against a duplicate passbook's being created at this time.

On-Line: This key operates the same as the Receive key except that it does not provide printing anywhere except on the audit tape. This key provides a code on input which indicates to the processor that this is a re-entry and no attempt should be made to update the passbook with unposted items. This key is locked down during this re-entry operation. Use of this key informs the computer that the return message should contain only information necessary to cause an extension of the new balance. With this key depressed, the transaction amount has already affected the accumulating total and the crossfooter, and the signal to extend balances is used to verify the old balance and the account number and to condition the window machine for the next entry.

Off-Line: This key has no function in this mode.

Balance Pick-Up Key

On-Line: The use of this key prints on the audit strip and adds to the crossfooter. The key is locked out against entry if the No-Book key has been depressed since the Account Number key was used or the balance was last extended. The key locks itself out and the No-Book key until the Account Number key is used or until the balance is extended.

Off-Line: Same as On-Line.

B Account Number Key

On-Line: The use of this key identifies the teller making the entry, prints on the audit tape, acts as an end-of-message signal to the computer, and unlocks the No-Book and Balance Pickup keys.

Off-Line: The B Account Number key prints on the audit tape and identifies the teller making the entry.

Duplicate Withdrawal Key

On-Line: This key will be used by the computer to update the passbook when the previous entry or entries have been made without a passbook, and the customer's record and the bank's record are not in agreement due to this fact. In order to print in the passbook, the Receive key also must be depressed.

Off-Line: In this condition, the Receive key must be locked down. Use of the Duplicate Withdrawal key prints on the audit tape and in the withdrawal column in the passbook, and subtracts from the crossfooter.

Plus Key

On-Line: Depression of the Plus key controls the add and subtract totalizer to cause additions to be made therein and prints on the audit tape. The use of this key locks out the Balance Pickup key and the No-Book key until after the Account Number key is used or after the balance has been extended. It will be used to print answers to inquiries on the validating printer when the amount being printed must add to the crossfooter. It also prints on the validating printer in the balance column in response to an inquiry.

Off-Line: Same as the On-Line mode.

Minus Key

On-Line: Depression of the Minus key controls the add and subtract totalizer to cause subtractions to be made therefrom and prints on the audit tape. The use of this key locks out the No-Book key and the Balance Pick-Up key until the Account Number key is used or until the balance is extended. It will also be used to print answers to inquiries on the validating printer when the amount being printed must be subtracted from the crossfooter.

Off-Line: Same as the On-Line mode.

Eject Key

On-Line: The Eject key is used to eject the passbook from the passbook printer and the form from the validating printer. When a check is being cashed, it is desirable to make a part of the customer's balance equal to the amount of the check, which is unavailable for withdrawal until the amount of the check has been collected from the bank on which it is drawn. This is accomplished by indexing the amount, depressing the Check or Special Check keys of the fourth transaction bank, and then depressing the Eject key to operate the machine and send the signal to the computer. When the account number has been entered, the message will be sent to the computer and recorded on that customer's account. Whenever the computer sends a message causing a light to be illuminated, it will include the number of that light as part of the message. The Eject key will be depressed by the computer to print the information on the audit tape and to make the passbook available to the teller for an examination.

Off-Line: This key will be used by the operator to operate the window machine when recording the cashing of a check and for the ejection of the passbook from the passbook printer.

A Account Number Key

On-Line: The functions of the A Account Number key are the same as those of the B Account Number key, described previously.

Off-Line: This key functions the same as the B Account Number key, previously described.

No-Book Key

On-Line: When a cash deposit is made by a customer and he does not present his book, this key is used with the Deposit key or the Withdrawal key to indicate that the transaction is not being recorded in the customer's passbook. The use of this key locks itself out in the Balance Pick-Up key until the Account Number key is used or the balance is extended. This key may also lock itself out, or it may be locked out by the Balance Pick-Up key, the Plus key, and the Minus key until the Account Number key is used or until the balance is extended.

Off-Line: The use is the same as the On-Line mode.

Duplicate Deposit Key

On-Line: The Duplicate Deposit key has the same effect as the Duplicate Withdrawal key except that it controls the add-subtract totalizer to cause additions to be made therein.

Off-Line: This key has the same effect as the Duplicate Withdrawal key except that it adds into the crossfooter.

B Deposit Key

On-Line: On an entry operation, the use of this key prints only on the audit tape but does not affect the crossfooter or the totals. When used with the Receive key, this key adds to the crossfooter and to its own total and prints in the deposit column on the passbook and on the validating printers. This key may also be used with the Special Check key or the Check key to designate the existence of an uncollected condition, on the deposit. When used with the Transfer key alone, it indicates that the deposit is being transferred and should retain the interest previously credited for the interest period. With the No-Book key, the Deposit key indicates that the customer's passbook is not being posted.

Off-Line: When this key is used in this mode of operation, the Receive key must be locked out. Under these conditions, it adds to the crossfooter and to its own total and prints on the uadit tape, the passbook printer, and the validating printer. It can be used in combination with the Transfer key, the Check key, the Special Check key, and the No-Book key in the manner described above.

B Withdrawal Key

On-Line: Does not affect the crossfooter or the totals and prints only on the audit tape on an entry operation. With the Receive key depressed, the use of this key prints on the withdrawal column on the passbook and the validating printer. It also subtracts from the crossfooter and adds to its own total. When used with the Transfer key, it designates that the withdrawn fund is actually a transfer to another account and that the anticipated interest should be carried forward to the new account. When used with the No-Book key, it designates that the customer's passbook is not being posted.

Off-Line: With the Receive key depressed, the use of this key subtracts from the crossfooter and adds to its own total and prints on the audit tape, the passbook printer, and the validating printer. Its use with the Transfer key in the No-Book key is the same as described above.

B Other Key

On-Line: The use of this key does not affect the crossfooter or the total on entry and prints only on the audit strip. With the Receive key depressed, usually this key will print in the deposit column on the passbook and the validating printers and add to the crossfooter and its own total. It may be used with the School Saving key, the Safe Deposit key, the Christmas key, the Insurance key, the Mortgage key, and the Teller's Check or Money Order key, located in the fourth transaction bank, to describe miscellaneous receipts.

Off-Line: The use of this key adds to the crossfooter and to its own total and prints on the audit strip and in the deposit column on the passbook in the validating printers. It is also used in combination with the transaction keys of the fourth transaction bank as described above.

Interest Key

On-Line: This key is activated only by a message from the computer except when used in a re-entry mode. In this latter condition, the Interest key is used with the Receive key to update a passbook. The use of the Interest key adds to the crossfooter and to its own total and prints on the audit tape and in the interest columns on the passbook and the validating printers.

Off-Line: With the Receive key depressed, the use of the Interest key prints on the audit tape, in the interest column of the passbook printer, and adds to the crossfooter and to its own total.

Withdrawal Correction Key

On-Line: This key is used to correct an incorrect withdrawal entry. This key prints only on the audit tape on an entry operation, but, with the Receive key depressed, it adds to the crossfooter and to its own total. When the Withdrawal Correction key and the Receive key are depressed by a computer message, the passbook printer prints in the deposit column in the passbook. This key is used in combination with the same keys as described with the A and B Withdrawal keys.

Off-Line: With the Receive key depressed, the use of this key adds to the crossfooter and to its own total for an entry operation. It also prints on the audit tape, prints in the deposit column on the passbook, and operates the validating printer.

Deposit Correction Key

On-Line: This key is used to correct an incorrect deposit entry. It prints only on the audit tape during an entry operation. With this key and the Receive key depressed by a computer message, the passbook printer prints in the withdrawal column the amount contained in the message; subtracts from the crossfooter; and adds to its own total. This key is used in combination with the keys in the second and fourth transaction banks as described in the operation of the A and B Deposit keys.

Off-Line: With the Receive key locked down, the use of this key during an entry operation subtracts from the crossfooter and adds to its own total, and prints on the audit tape, the passbook, and the validating form. Other than an entry operation, the use of this key prints in the withdrawal column on the passbook and operates the validating printer.

A Other Key

This key operates in the same manner as the B Other key, described previously in the On-Line and Off-Line mode.

A Withdrawal Key

This key operates in the same manner as the B Withdrawal key, previously described in the On-Line and Off-Line mode.

A Deposit Key

This key operates in the same manner as the B Deposit key, previously described in the On-Line and Off-Line mode.

School Saving Key, Safe Deposit Key, Christmas Key, Insurance Key, Mortgage Key, Teller Check and Money Order Key These keys are descriptive keys and are used in conjunction with the operation of the A Other key and the B Other key, previously described.

Transfer Key

On-Line: This key is used with the B Withdrawal key, the Withdrawal Correct key, and the A Withdrawal key to signal the computer that the money being withdrawn is actually being transferred to another account. It is also used with the B Deposit key, the Deposit Correct key, and the A Deposit key to signal that the deposit being made is a transfer and should carry with it an anticipated interest accrued in the original count.

Off-Line: This key is used to identify visually that the above-described situations exist.

Check and Special Check Keys

On-Line: These keys are used with the B Deposit key, the Deposit Correct key, and the A Deposit key on input to indicate that the deposits are made up of checks which have not yet been collected. Each of the Check and Special Check keys represents a different length of delay before the money will be available for withdrawal. These keys are also used with the Eject key to indicate that a check is being cashed and an amount equal to the amount of the check should be made unavailable in that customer's account until the check has been collected. When used with the Receive key and the B Deposit key, the Deposit Correct key and the A Deposit key, it operates the passbook printer to print in the customer's passbook for visual identification that the amount of this deposit is not immediately available.

Off-Line: These keys are used with the Receive key and the B Deposit key, the Deposit Correct key and the A Deposit key in the manner described above.

Figure 3:
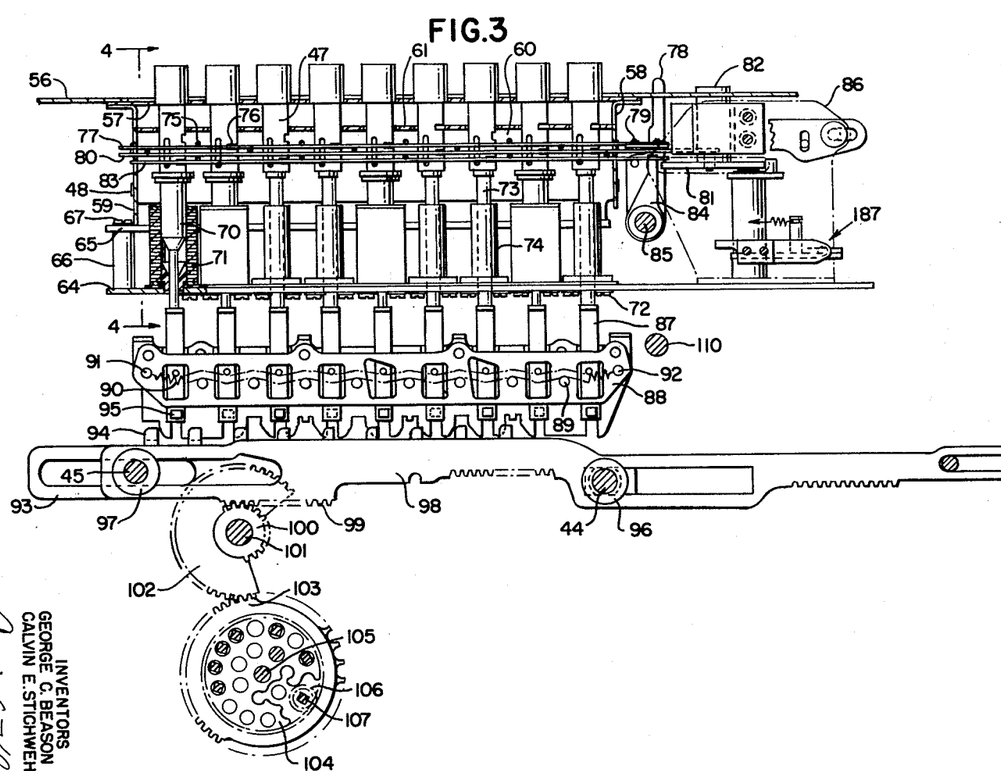
FIG. 3 is a side detailed cross-sectional view taken at the right of the first transaction bank, showing the auxiliary keyboard, the regular keyboard, the differential slide, and the transmission line.
Figure 4:
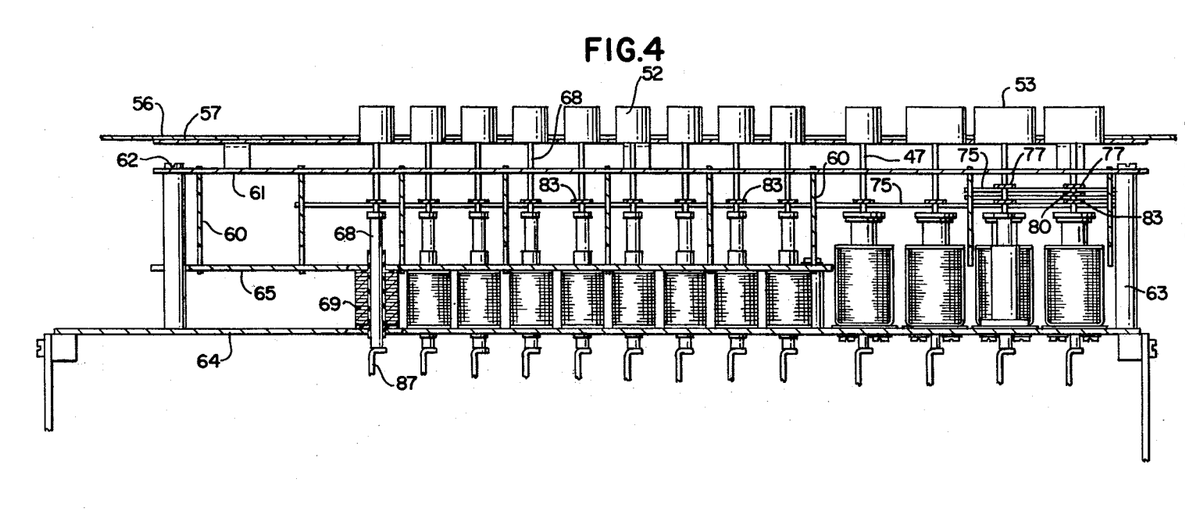
FIG. 4 is a front partial sectional view taken along the line 4—4 of FIG. 3, showing the construction of the solenoid-operated auxiliary keyboard.

Referring now to FIGS. 3 and 4, there are shown sectional views of the auxiliary keyboard assembly mounted on the standard keyboard of the machine disclosed in the previously-cited Placke et al. United States patent. The auxiliary keyboard assembly is positioned within a cabinet frame 56 and includes a top plate 57 riveted into a front plate 58 and a back plate 59 (FIG. 3). Nine partition plates 60 (FIG. 4) are provided to form compartments in which the four banks of transaction keys and the nine banks of amount keys are located. The rear ends of the partition plates 60 are provided with ears 48, which projected into slots located in the back plate 59, and with similar ears mounted on its front end projecting into slots located in the front plate 58. After being inserted into said slots, the ears are riveted over to hold them firmly in place. Each partition plate 60 is also provided on its top edge with a number of similar ears, which project up to the under side of an upper intermediate plate 61 (FIG. 4), which in turn is mounted on its sides by means of screws 62 to supports 63, which in turn are mounted on the bottom plate 64 of the auxiliary keyboard assembly. Each of the partition plates 61 is positioned on the lower intermediate plate 65 (FIG. 4). As shown in FIG. 3, the lower intermediate plate 65 is attached to a support 66 by means of screws 67, the support 66 in turn being attached to the bottom plate 64. The partition plates 60 support a series of rods 75, which in turn support the various types of detents for the amount banks and the transaction banks in a manner which will now be described.

The top plate 57 of the auxiliary keyboard is provided with a series of round openings (not shown), which accommodate the tips of the amount keys 52 and the transaction keys 53. Slots located in the upper intermediate plate 61 and holes located in the lower intermediate plate 65 and in the bottom plate 64 accommodate the key stem assemblies of each of the transaction and amount keys. Thus each of the slots forms a means for guiding the keys in their up-and-down movements.

As shown in FIG. 4, each of the amount keys has a key stem assembly which consists of a key stem 46 engaging the plunger 68 of an associated solenoid 69, which is mounted between the lower intermediate plate 65 and the bottom plate 64. The key stem 47 of each of the transaction keys 53 engages a similar plunger 70 (FIG. 3) of an associated solenoid 71, which is secured to the bottom plate 64 by a pair of screws 72. Because the load to be overcome by the transaction keys is greater than the load to be overcome by the amount keys, it will be seen that the solenoids 71 of the transaction keys are of a larger strength than the solenoids 69 of the amount keys. It will also be seen from FIG. 3 that some of the keys in the first transaction bank do not required a solenoid, because of the nature of their operation. Therefore control by the computer is not necessary. Keys of this type which are included in the first transaction bank are the Overdraft key, the Total key, the Sub-Total key, the Re-Entry key, and the Void key. In the second transaction bank, the Account Number key, the B Account Number key, and the Balance Pick-Up key do not require a solenoid. In this case, each of the key stems 47 engages a plunger 73, which is supported in a guide member 74 mounted to the bottom plate 64 by means of the screws 72. It will be seen that, with this construction just described, manual depression of a key of either the amount banks or the transaction banks results in the downward movement of its associated plunger. Energization of its associated solenoid also provides the same result.

Each of the partition plates 60 has a plurality of apertures which accommodate a number of rods 75, extending the width of the auxiliary keyboard, and acting as a support for a number of detents which will now be described. As shown in FIG. 3, three detents, 77, 80, and 83, are associated with the first transaction bank. Each of the detents consists of a slide having a number of slots into which are positioned the stems 46, 47 of the various keys. It will be seen from FIG. 3 that each of the transaction keys has a slot 76, which is located adjacent one of the slots of an associated detent. Depending on what key will be controlled by what detent will determine the positioning of the slot on the body of the key. The upper detent 77 of the first transaction bank as shown in FIG. 3 is characterized as a lever lock detent. The front end of this detent is attached to a lockout lever 78 by means of rivets 79. The lockout lever 78 is accessible for movement by the operator. As shown in FIG. 4, the second transaction bank also has a lever lock detent 77, which in turn is also connected to the lockout lever 78. Movement of the lockout lever 78 by the operator positions a solid portion of the detent within the slot 76 of the transaction keys which are to be locked out. In this case, the Sub-Balance key, the Overdraft key, the Void key, and the Override key of the first transaction bank and the Eject key of the second transaction bank are locked out by the movement of the lockout lever.

The second detent associated with the first transaction bank is labeled the key lock detent 80. The front end of this detent is mounted on a control arm 81, which in turn is operated by a key lock 82. The key lock detent provides control over certain keys in the first transaction bank. In the present case, operation of the key lock detent 80 by the insertion of a key into the key lock 82 will lock out the Total key, the Receive key, and the Re-Entry key.

The third detent associated with the first transaction bank is a top lock detent 83, whose function is to lock out all the keys of the auxiliary keyboard upon the depression of any one of a number of keys in the transaction banks. Each of the amount banks and transaction banks is supplied with a top lock detent. As will be explained more fully hereinafter, when the operator is inserting into the keyboard the information necessary to complete a deposit transaction, the last message of this information is the account number. Therefore, when the operator depresses the account number key in the second transaction bank, all of the amount and transaction keys should be locked out to prevent any further operation by the operator. In order to accomplish this, the front end of each of the top lock detents 83 is attached to a lever 84, mounted on a shaft 85, which extends the width of the auxiliary keyboard. When the account number key is depressed by the operator, the top lock detent is moved to the left by a mechanism which will be described hereinafter, thereby rotating the shaft 85 counter-clockwise. Each of the top lock detents 83 of the other transaction and amount banks is also similarly controlled by the shaft 85. Thus the counter-clockwise movement of the shaft 85 imparts a similar movement to the other top lock detents, thereby locking out each of the keys of the keyboard. The construction of the auxiliary keyboard and its associated detents is quite similar to the keyboard disclosed and described in the previously-cited Placke et al. United States patent. For any further detailed information, reference should be made to that patent.

The key lock 82 (FIG. 3) is mounted on a bracket 86, which in turn is mounted to the bottom plate 64 of the auxiliary keyboard. Associated with the operation of the key lock 82 are a number of switches, which, while forming no part of the present invention, are generally indicated as 187 in FIG. 3.

The auxiliary keyboard 50 is mounted on a standard keyboard of the window machine of the type described in the previously-cited Placke et al. patent. As shown in FIG. 3, the lower end of the plunger of each of the keys of the auxiliary keyboard engages the top of the key stem 87 of the keys of the regular keyboard. The operation of the regular keyboard is of a standard nature and is fully disclosed in the previously-cited Placke et al. patent. It will thus be described here in its briefest form. As shown in FIG. 3, each of the key stems 87 is mounted for vertical movement in a manner similar to that described previously for the key stems 46, 47 of the auxiliary keyboard. Additional structure includes an auxiliary plate 88, which acts as a support for a series of studs 89, which in turn act as a guide for a coil spring 90, stretching from a stud 91 near the front end of the auxiliary plate to a stud 92 near the rear end of the auxiliary plate. The coil spring 90 forms a means for restoring the key stems 87 and holding them in their upper, or undepressed, positions. Each of the amount and transaction banks of the regular keyboard includes a flexible detent (not shown), whose function is to lock any depressed key in its depressed position and to return that key to its undepressed position upon the depression of another key in that same bank.

Located beneath each bank of key stems 87 is a differential actuator slide 93, the movement of which is controlled by operation of the key stems. Each actuator slide 93 of the transaction banks (FIG. 3) is suitably slotted to be supported by, and slide on, two collars 96, 97, which are supported on studs 44, 45, respectively, which in turn are mounted on the machine framework. Each actuator slide has, mounted in its upper surface, a plurality of projections 94, which coact with studs 95 mounted on the lower end of the key stems 87. In the case of the key stems in the amount banks, the projections on the slide 93 take the form of bent ears which engage the lower edge of the key stem 87.

As shown in FIG. 3, the studs 95 of the transaction key stems 87 project alternately to the right and to the left into the path of the projections 94, which in turn are alternately arranged on the slide 93. The relationship between the studs 95 and the projections 94 is such that, on operation of the machine with a key depressed, the slide 93 is driven forwardly until it is arrested in a position commensurate with the position of the depressed key. The differential actuator slide 93 drives a second slide 98, which is characterized as a control slide. As shown in FIG. 3, the control slide 98 has three sets of teeth, one set of which, 99, engages and drives a gear segment 100 rotatable on a shaft 101. Connected to the segment 100 by a hub is another segment 102, which meshes with a ring gear 103 provided with internal teeth and rotatably mounted on a disc 104 carried by the shaft 105. A pinion 106 meshes with the internal teeth of the ring gear 103 and is mounted on a square shaft 107 extending between the side frames (not shown) of the machine framework. As described more fully in the previously-cited Placke et al. United States patent, rotation of the ring gear 103 controls the positioning of a number of notched control plates 108 (FIGS. 7 and 8) due to the coaction between the internal teeth of the ring gear 103 and the pinion 106, resulting in the rotational driving of the square shaft 107 a predetermined distance commensurate with the movement of the control slide 98. Rotation of the square shaft 107 transmits this motion to a similar pinion 109, which engages the internal teeth of the notched plate 108. Each transaction bank controls one or more square shafts, each of which in turn controls a different notched control plate. With the construction just described, it will be seen, the depression of any one key in the transaction banks results in the movement of the differential slide 93 and the control slide 98 a distance commensurate with the position of the depressed key. This movement is transmitted through the segments 100, 102 to the ring gear 103 and the square shaft 107 to position an associated notched plate for a purpose which will be described hereinafter.

The depression of certain keys in the transaction banks results in the operation of the machine. These include all of the keys of the third transaction bank, all of the keys in the second transaction bank except the No-Book key, and all the keys in the first transaction bank except the Total, Sub-Total, Receive, and Re-Entry keys. This is accomplished by the rocking of a shaft 110, located adjacent the front end of the transaction banks and controlled by a mechanism (not shown) which is similar to the lever 84 in the auxiliary keyboard. A detent similar to the top lock detent 83 of the auxiliary keyboard rocks the shaft 110 whenever the required transaction key is depressed. For a full disclosure of this mechanism, reference should be made to the previously-cited Placke et al. United States patent, No. 2,774,298.

As previously disclosed, the amount banks have a similar construction, in that each bank has a pair of slides similar to the slides 93 and 98. The primary function of these slides is to introduce the amounts set up on the keyboard into the totalizers. For a full disclosure of the amount bank construction and its function, reference should be made to the previously-cited Placke et al. United States patent.

In order to convert the information set up in the keyboard to electrical impulses which are capable of being sent to the controller and from there to the computer, each control slide 98 of each of the amount and transaction banks is connected to the wiper of a switch (not shown), which is set by the movement of the control slide commensurate with the amount or the position of the key depressed in the particular bank, in the manner previously described. This construction is an old expedient in the art, as shown in United States Patent No. 2,972,442, issued February 21, 1951, to Mayo A. Goodbar et al., and in United States Patent No. 3,006,538, issued October 31, 1961, to Johann J. Deutsch. Reference should also be made to the co-pending United States patent application of Charles J. Nagy, Serial No. 96,595, filed March 17, 1961. After the switches are set, the controller interrogates the machine and reads the information set up in the switches, in a manner well known in the art. The controller unit then takes this information and converts it into a code which is acceptable to the computer, and then transmits it to the buffer unit, which, at the proper time, introduces the information into the computer.

There will now be described a typical operation of the auxiliary keyboard and its associated bank teller machine during a deposit transaction. As part of this transaction, the operator verifies the cash account and indexes the passbook balance on the keyboard. She then depresses the Balance Pick-Up key, which initiates a machine operation, and this information is then transferred from the keyboard into the readout switches. The controller then takes this information from the readout switches and stores it. The operator then indexes the amount of the transaction and depresses the Check or Special Check key and the Deposit key, thereby initiating a second operation of the machine, resulting in the transfer of the information to the switches and from there to the controller. The operator then indexes the account number, inserts the passbook into the machine, and depresses the Account Number key, which initiates a third operation of the machine, during which the information is transmitted to the readout switches and then to the controller. Depression of the Account Number key also locks out the auxiliary keyboard, thereby preventing any further operator control of the machine. The novel mechanism which allows the Account Number key to lock out the auxiliary keyboard will now be described.

Figure 2:
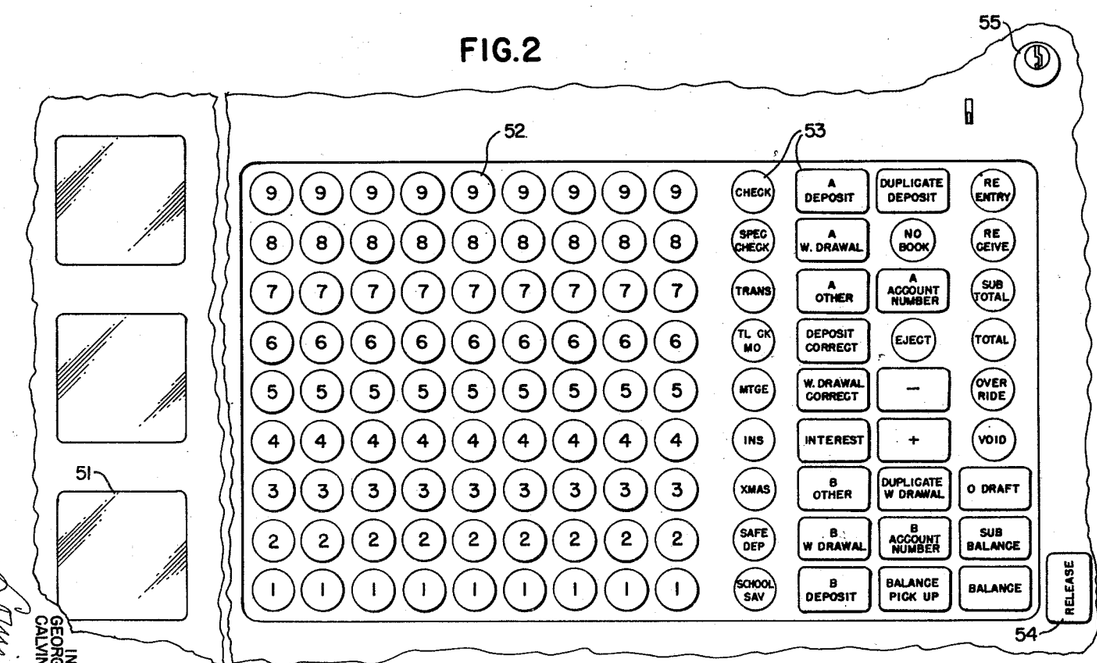
FIG. 2 is a diagrammatic view of the auxiliary keyboard arrangement.
Figure 5:
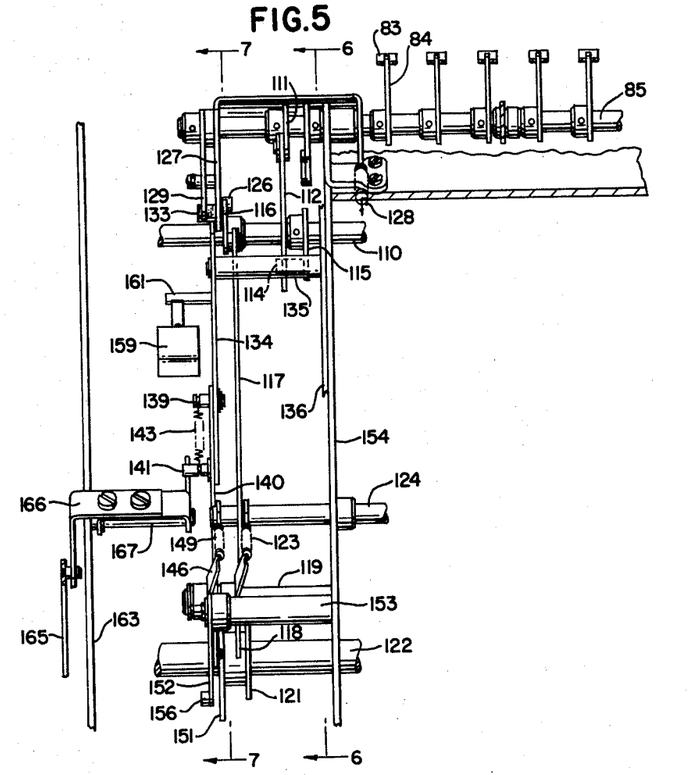
FIG. 5 is a front view of the auxiliary keyboard lockout control mechanism.
Figures 6, 7, 8, 9:
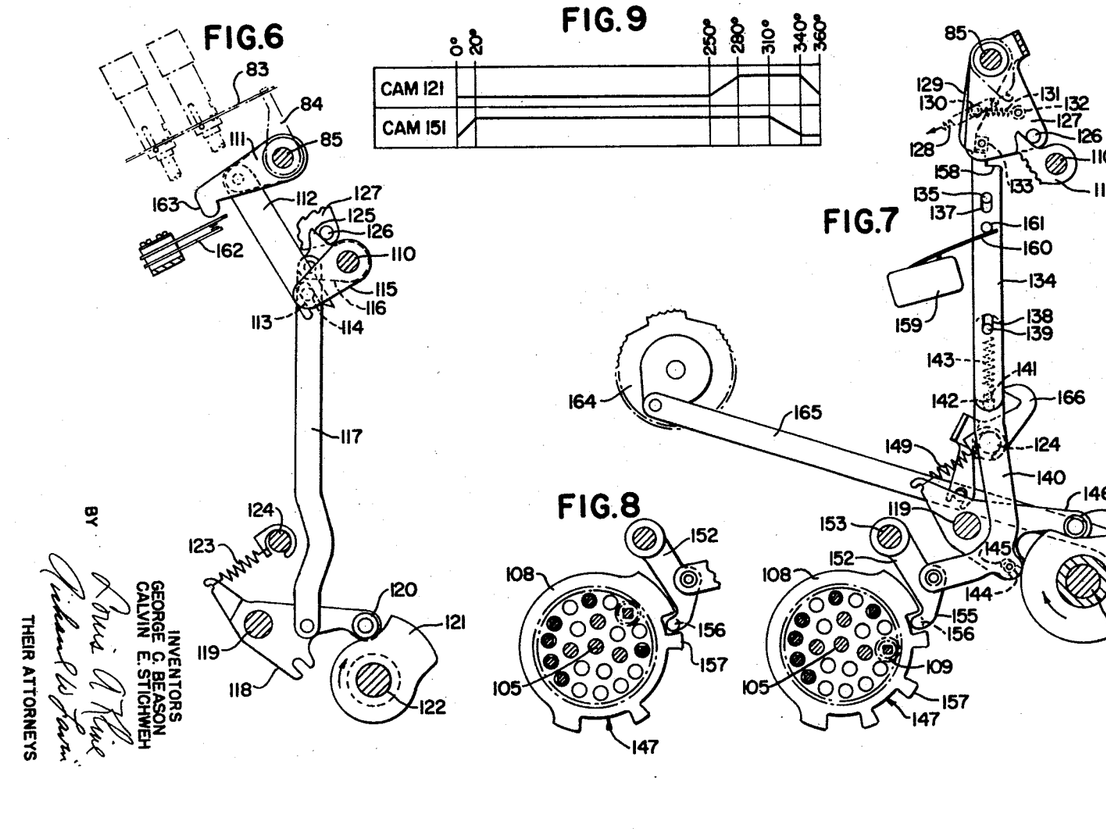
FIG. 6 is a sectional view taken on line 6—6 of FIG. 5.
FIG. 7 is a sectional view taken on line 7—7 of FIG. 5.
FIG. 8 is a sectional detail view of the lockout control plate, showing the positioning of a sensing feeler within one of the notches of the plate.
FIG. 9 is a time chart showing the operation of several of the control cams.

Referring to FIG. 5, 6, and 7, there is shown the mechanism for controlling the position of the key lock detents 83 of the auxiliary keyboard. Located on the left-hand side of the auxiliary keyboard, and secured to the shaft 85, is an arm 111 (FIG. 6), the other end of which rotatably supports a link 112. The lower portion of the link 112 contains a slot 113, within which is slidably positioned a stud 114 supported on an arm 115, which in turn is secured to the shaft 110. As will be described more fully hereinafter, the shaft 110 is controlled by the Release key 54 (FIG. 2) to release all of the depressed keys in the auxiliary keyboard.

Also rotatably mounted on the shaft 110 is a second arm 116 (FIGS. 5 and 6), one end of which rotatably supports an actuating link 117. The lower portion of the actuating link 117 is rotatably connected to a cam follower 118, which in turn is free on a shaft 119 located in the machine framework. Mounted on one end of the cam follower is a roller 120, which coacts with a cam 121 mounted on a cam shaft 122. As more fully described in the previously-cited Placke et al. United States patent, No. 2,774,298, the cam shaft 122 is driven off the main drive shaft of the machine. Thus the cam 121 rotates during each operation of the machine. The other end of the cam follower 118 is engaged by a spring 123, which is secured to a shaft 124 mounted within the framework of the machine. The spring 123 normally urges the roller 120 into engagement with the cam 121. It is seen from this construction that, upon clockwise operation of the cam 121, which occurs during each machine operation, the actuating link 117 is driven upwardly, thereby imparting a clockwise rotation to the arm 116.

The arm 116 has a raised portion 125 (FIG. 6), which engages a stud 126, mounted on a lock yoke 127. The lock yoke 127 is rotatably supported on the shaft 85, and, as seen from FIG. 5, one side of the yoke is engaged by a spring 128, secured to structure (not shown) located in the main framework. The spring 128 urges the lock yoke clockwise (FIG. 7) about the shaft 85. Associated with the lock yoke 127 is an alarm 129, pinned to the shaft 85. Mounted on the arm 129 is a stud 130, to which is attached one end of a spring 131, the other end of which is connected to a stud 132, mounted on the lock yoke 127. The clockwise movement of the arm 116 is transmitted to the lock yoke 127 by the raised portion 125, resulting in a counter-clockwise movement of the lock yoke about the shaft 85. Due to the interconnection of the lock yoke 127 and the arm 129 by the spring 131, the arm 129 follows the movement of the lock yoke, resulting in the counter-clockwise movement of the shaft 85. Rotation of the shaft 85 rocks each of the levers 84 (FIGS. 5 and 6) of the key banks in a movement resulting in the movement of each of the top lock detents 83 of the key banks to the left, as viewed in FIG. 6, which locks out each of the keys in that bank.

Mounted on the lower portion of the lock yoke 127 is a stop stud 133. As shown more clearly in FIG. 5, the lower portion of the arm 129 is urged into engagement with this stud by the action of the spring 131. Associated with the stop stud 133 is a selecting link 134, mounted on a stud 135, which in turn is mounted to a side frame member 136 (FIG. 5) of the main framework. As shown in FIG. 7, the stud 135 is slidably positioned within a slot 137, which allows the link to be moved upwardly. The lower portion of the link 134 contains a second slot 138, within which is slidably positioned a stud 139, mounted on the upper portion of a link 140, for providing additional support for the link 134. Mounted on the lower portion of the selecting link 134 is a second stud 141, which projects through a slot 142 located in the upper portion of the link 140. A spring 143 engages the stud 141 and the stud 139 (FIG. 5), thereby acting as an elastic link between the actuating link 134 and the link 140. The lower portion of the link 140 has a stud 144, which is positioned within a slot 145, located in one portion of a cam follower 146. The cam follower 146 is rotatably supported on the shaft 119 and is of a similar construction to the cam follower 118, previously described, included a roller 148 and a spring 149, one end of which is secured to the shaft 124. The roller 148 of the cam follower 146 is urged by the spring 149 into engagement with a cam 151 secured to the cam shaft 122.

Rotatably mounted on the lower portion of the link 140 is a selection arm 152 (FIG. 7), one end of which is free on a shaft 153, which in turn is supported on a side frame 154 (FIG. 5) of the machine framework. The other end of the selection arm has a sensing feeler portion 155, on which is mounted a stud 156. As shown in FIGS. 7 and 8, two notched control plates 108 coact with the stud 156 to control the locking of the key lock detents 84 of the auxiliary keyboard in a manner which will now be described. The notched plate 108 shown in FIG. 7 is controlled by the first transaction bank in the manner described previously. Certain keys in the Row 1 transaction bank, when depressed, position the notched plate 108 (FIG. 7) so as to present a high surface 157 adjacent the stud 156 of the selection arm. These include the Sub-Balance key, the Override key, and the Receive key. The remaining keys of the Row 1 transaction bank present a notched section 147 of the control plate adjacent the stud 156. The notched control plate of FIG. 8 is controlled by the second row of transaction keys. In this row, the A and B Account Number keys, when depressed, present a high surface 157 adjacent the stud 156. It will be seen from this arrangement that depending on whether a pair of notches or a high surface is positioned adjacent the stud 156 will the extent of the rotational movement of the selection arm 152 be controlled. This movement of the selection arm 152 controls the locking of the key lock detent in a manner which will now be described.

Upon the entering of information into the keyboard and the subsequent depression of one of the motorized transaction keys, a machine operation is initiated. As shown in FIG. 9, during the first twenty degrees of revolution of the main drive shaft, the cam 151 is rotated clockwise, thereby rotating the cam follower 146 (FIG. 7) counter-clockwise about the shaft 119. This movement of the cam follower slides the link 140 upwardly, thereby rotating the selection arm 152 counter-clockwise. This removes the stud 156 out of engagement with the notched control plates 108, thereby allowing each of the control plates to be positioned according to the transaction keys depressed. This occurs between third degrees and ninety degrees of rotation of the main drive shaft. The upward movement of the link 140 moves the selecting link 134 upwardly until it engages the stop stud 133. Since the upward movement of the link 140 is greater than the movement of the selecting link, this additional movement is absorbed by the spring 143. At two hundred and fifty degrees of revolution of the main cam shaft, the cam 121 actuates its cam follower 118 counter-clockwise about the shaft 119. This movement is completed at two hundred and eighty degrees of revolution of the main cam shaft, as shown in FIG. 9. This counter-clockwise movement of the cam follower 118 is transmitted to the link 117, resulting in the clockwise rotation of the arm 116 (FIG. 6) about the shaft 110 and the counter-clockwise movement of the lock yoke 127 about the shaft 85, thereby positioning the stop stud 133 adjacent the cutout portion 158 of the selecting link 134. This allows the selecting link to move up under action of the spring 143 and position its end adjacent the stop stud 133 in a blocking position.

As described previously, the counter-clockwise movement of the lock yoke 127 also results in the arm 129 and the shaft 85 being rocked counter-clockwise, which moves all of the top lock detents 83 to a position locking out all the keys of the keyboard. At three hundred and ten degrees of revolution of the main drive shaft, the cam 151 rotates the cam follower 146 clockwise. If the notched control plates 108 have been positioned so as to present a pair of notches adjacent the stud 156, the cam follower 146 rotates clockwise, thereby withdrawing the top portion of the selecting link 134 from engagement with the stop stud 133 of the lock yoke 127. When this occurs, the lock yoke 127 and the arm 129 are rotated clockwise under the action of the spring 128. This action rocks the shaft 85 clockwise, thereby returning all of the top lock detents to their home positions and unlocking the keyboard. If the notched control plates had been positioned so as to present a high surface 157 adjacent the stud 156, the action of the cam 151 would have had no effect on the cam follower 146, thereby allowing the link 134 to remain in its blocking position and the top lock detents to remain in their locking position. It is seen from this structure that any of the keys of the transaction banks may be programmed to either lock out the auxiliary keyboard or not, depending on the nature of the transaction in which the window machine is involved. As indicated previously, depression of the A or B Account Number key in the second row of the transaction keys presents a high surface to the stud 156, thereby locking out the auxiliary keyboard. Depression of the Sub-Balance, Overdraft, or Void key in Row 1 transaction bank also presents a high surface to the stud 156, which results in the auxiliary keyboard's being locked out.

Referring to FIG. 7, there is shown, adjacent the selecting link 134, a switch 159, having a switch arm 160, one end of which is mounted adjacent a stud 161 located on the link 134. Each time the link 134 is moved upwardly by operation of the cam 151, the switch 159 operates to transfer the operation to the controller for reading the information set up in the auxiliary keyboard. A second switch 162 (FIG. 6) is also closed for the same purpose by the action of an arm 163, pinned to the shaft 85. The information read by the controller is sent to the computer for the updating of the customer's account.

To complete the transaction, the computer transmits the new information back to the auxiliary keyboard, where the various solenoids 69 (FIGS. 3 and 4) are energized, resulting in the positioning of the selected key stems 87 in a depressed position. A machine operation is initiated by the energization of a solenoid of a motorized transaction key, resulting in the entry of the new information into the customer's passbook and the positioning the notched control plates 108 (FIGS. 7 and 8) so as to present a pair of notches 147 to the stud 156. This allows the selection arm 152 to rotate clockwise about the shaft 153, thus removing the link 134 from the stop stud 133 and unlocking the auxiliary keyboard for a subsequent operation.

In case there is a breakdown in the computer or one of the auxiliary equipments, the window machine may be operated independently. When this occurs, the auxiliary keyboard lockout mechanism is required to be disabled. This is accomplished by means of a knob 164 (FIG. 7) mounted on the side of the machine. Rotation of the knob activates a link 165 (FIGS. 5 and 7), movement of which rotates, in a counter-clockwise direction as viewed in FIG. 7, a lock yoke 166 free on a shaft 167 (FIG. 5) mounted on a side frame 168 of the machine. Rotation of the lock yoke 166 engages the stud 141 (FIG. 5), preventing the upward movement of the link 134.

When the need arises to release the auxiliary keyboard after it has been locked up, depression of the Release key 54 (FIG. 2) rocks the shaft 85 clockwise, moving each of the top lock detents 83 to an unblocking position, thereby releasing the keys of the keyboard. Rotation of the shaft 85 is transmitted by the link 112 (FIG. 6) to the shaft 110, rotation of which releases the key stems 87 of the regular keyboard to their home position.

While the form of the invention shown and described herein is admirably adapted to fulfill the objects primarily stated, it is to be understood that it is not intended to confine the invention to the form or embodiment disclosed herein, for it is susceptible of embodiment in various other forms.

What is claimed is:

1. In a machine of the class described, constructed and arranged to perform a machine operation, the combination of
   (a) a plurality of differentially-settable members;
   (b) a plurality of keys mounted on a keyboard including a first set of keys for controlling the extent of movement of the settable members during each machine operation;
   (c) a plurality of detent members slidably mounted in said keyboard, said detent members disabling said plurality of keys when moved to a first position;
   (d) means for moving said detent members to said first position during each machine operation including
   (e) a shaft mounted adjacent said plurality of detent members;
   (f) means interconnecting each of said detent members with said shaft, whereby, upon rotation of said shaft, each of said detent members is moved to said first position;
   (g) a pair of cycle control actuating means operated during each machine operation;
   (h) means for actuating said shaft when operated including a yoke member having a stop portion;
   (i) a link assembly having two members resiliently connected, said assembly being actuated by one of said cycle control means during the first part of a machine operation to yieldingly engage one of said link members against said stop portion;
   (j) a second link actuated by the other of said cycle control actuating means for operating said shaft actuating means thereby moving each of said detent members to said first position, said operation of said shaft actuating means also rotating the stop portion of said yoke member out of engagement with said link member whereby the link member moves to a position blocking the return movement of said stop position;
   (k) means for disabling the return movement of said link member from its blocking position by said cycle control means during the second part of the machine operation including
   (l) a plurality of control discs differentially settable under control of said differential settable members during each machine operation; said control discs having a plurality of spaced high and low surfaces;
   (m) and sensing means mounted adjacent said control discs and connected to said link assembly, said sensing means being operated by said cycle control means during the second part of the machine operation to sense said control discs whereby said link assembly is disabled from movement upon the sensing of a high surface by said sensing means.

2. In a machine of the class described, constructed and arranged to perform a machine operation, the combination of
   (a) a plurality of differentially settable transaction members;
   (b) a plurality of keys mounted on a keyboard, said keys including a set of transaction keys for controlling the extent of movement of the settable members during each machine operation;
   (c) a plurality of detent members slidably mounted in said keyboard, said detent members disabling said plurality of keys when moved to a first position;
   (d) means for moving said detent members to said first position during each machine operation including
   (e) a shaft mounted adjacent said plurality of detent members;
   (f) means interconnecting each of said detent members with said shaft, whereby, upon rotation of said shaft, each of said detent members is moved to said first position;
   (g) a pair of cycle control actuating means operated during each machine operation;
   (h) means for actuating said shaft when operated including a yoke member having a stop portion;
   (i) a link assembly having two members resiliently connected, said assembly being actuated by one of said cycle control means during the first part of a machine operation to yieldingly engage one of said link members against said stop portion;
   (j) a second link actuated by the other of said cycle control actuating means for operating said shaft actuating means thereby moving each of said detent members to said first position, and operation of said shaft actuating means also rotating the stop portion of said yoke member out of engagement with said link member whereby the link member moves to a position blocking the return movement of said stop portion;

(k) means for disabling the return movement of said link member from its blocking position by said cycle control means during the second part of the machine operation including (l) a plurality of control discs differentially settable under control of said transaction members during each machine operation, each of said control discs having a plurality of spaced high and low sensing surfaces each representing a transaction key;

(m) and a sensing means mounted adjacent said control discs and connected to said link assembly, said sensing means being operated by said cycle control means during the second part of the machine operation to sense the surface of said control discs whereby said link assembly is disabled from movement from its blocking position upon the sensing of a high sensing surface by said sensing means.

3. The machine of claim 2 in which said shaft actuating means includes an arm secured to said shaft, a spring member interconnecting said arm with said yoke member whereby upon rotation of said yoke member by said second link, said arm is rotated in the same direction to rotate said shaft.

4. The machine of claim 2 in which said sensing means comprises a feeler arm supported intermediate its ends by one end of said link assembly whereby the movement of said link assembly from its blocking position by operation of the cycle control actuating means during the second part of the machine cycle is stopped upon the sensing of a high surface of one of said control discs by the feeler arm.

5. In a machine of the class described, constructed and arranged to perform a machine operation, the combination of (a) a plurality of differentially settable transaction members;

(b) a plurality of keys mounted on a keyboard, said keys including a set of transaction keys for controlling the extent of movement of the settable members during each machine operation;

(c) a plurality of detent members slidably mounted in said keyboard, said detent members disabling said plurality of keys when moved to a first position;

(d) detent actuating means mounted adjacent each of said detents which upon operation will move each of said detent members to said first position;

(e) a first and second cycle control actuating means operated during each machine operation;

(f) means including a rotatable member for operating said detent actuating means when rotated, said rotatable member having a stop surface;

(g) a link assembly having two members interconnected by a resilient means, said assembly being actuated by said first cycle control actuating means during the first part of a machine operation to move one of said two members to a position yieldingly engaging said stop surface;

(h) a second link actuated by the second cycle control actuating means subsequently to the operation of said link assembly for rotating said rotatable member thereby operating said detent actuating means, said rotation moving the stop surface out of engagement with said link assembly member allowing said member to be positioned by the action of the resilient means so as to block the return movement of the rotatable member;

(i) a plurality of control discs differentially settable under control of said transaction members during each machine operation, each of said control discs having a plurality of spaced high and low sensing surfaces each representing a transaction key;

(j) and a sensing means mounted adjacent said control discs and connected to said link assembly, said sensing means being operated by said first cycle control means during the second part of the machine operation to sense the surface of said control discs whereby said link assembly is disabled from moving from its blocking position upon the sensing of a high sensing surface by said sensing means.

No references cited.

UNITED STATES PATENT OFFICE
CERTIFICATE OF CORRECTION

Patent No. 3,158,318　　　　　　　　　　　　　November 24, 1964

George C. Beason et al.

It is hereby certified that error appears in the above numbered patent requiring correction and that the said Letters Patent should read as corrected below.

Column 1, line 20, for "an" read -- on --; column 6, line 75, for "uadit" read -- audit --; column 13, line 18, for "alarm" read -- arm --; line 57, for "included" read -- including --; column 14, line 28, for "third" read -- thirty --; column 16, line 26, for "position" read -- portion --; line 75, for "and" read -- said --.

Signed and sealed this 27th day of April 1965.

(SEAL)
Attest:

ERNEST W. SWIDER　　　　　　　　　　　　　EDWARD J. BRENNER
Attesting Officer　　　　　　　　　　　　　Commissioner of Patents